Feb. 8, 1966   E. J. HERBENAR   3,233,929
BALL JOINT
Filed June 29, 1962
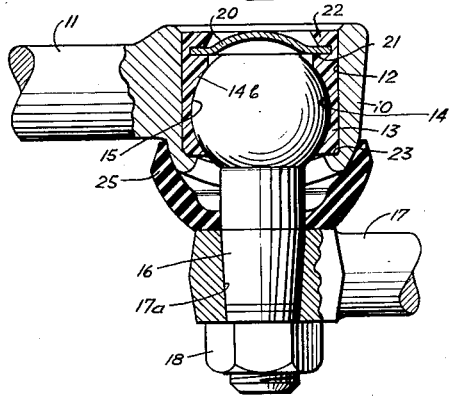
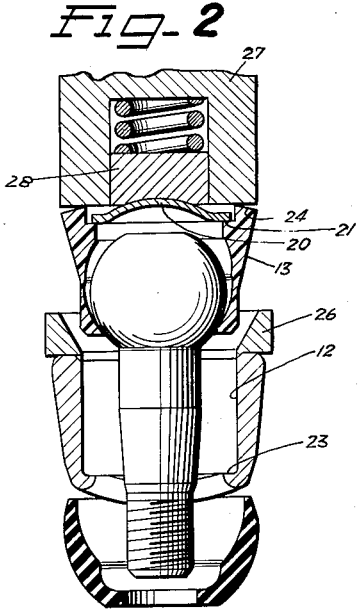
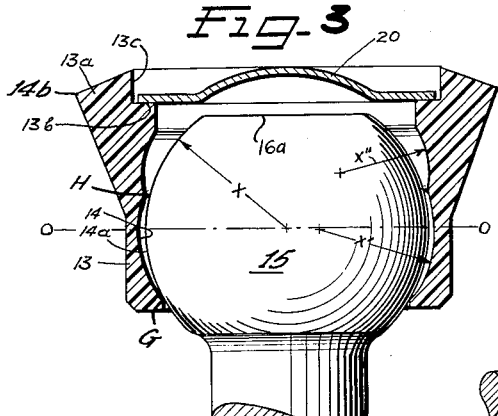
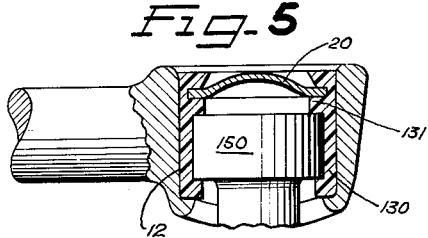
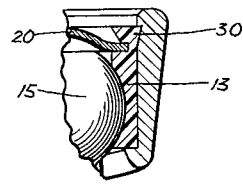
INVENTOR.
Edward J. Herbenar
BY
ATTORNEYS United States Patent Office 3,233,929
Patented Feb. 8, 1966

3,233,929
BALL JOINT
Edward J. Herbenar, Detroit, Mich., assignor to
TRW Inc., a corporation of Ohio
Filed June 29, 1962, Ser. No. 206,216
4 Claims. (Cl. 287—87)

The present invention relates to the construction and manufacture of pivot joints and is, more particularly, directed to the construction of an extremely simple and inexpensive joint in which the joint components are satisfactorily sealed against grease loss or the ingress of foreign contaminants.

As those skilled in the art of automotive swivel or ball joint constructions are aware, it has been conventional practice to provide a sheet metal closure plate for sealing the bottom of the socket aperture. This closure plate generally sits in a recess formed in the joint housing and is maintained against a shoulder therein by a spun-over lip of the housing. The closure plate acts, upon such assembly, as a sealing wall and as a reaction wall against which the spring ordinarily biasing the socket parts into bearing engagement, acts. In such conventional prior art devices, it has been necessary to provide a spinning or forging step in the manufacturing process.

In accordance with the present invention a ball joint or swivel joint construction is provided wherein a closure plate is utilized, as in prior designs, but wherein the closure plate is not retained by deforming the metal of the ball joint housing. Instead, the closure plate is retained integrally in the assembled unit by deformation of the plastic joint liner, which deformation occurs during assembly of the joint without any requirement for heavy forging or spinning dies. A perfect seal is provided around the closure plate by embedding action. At the same time the presence of the closure plate provides, in combination with lateral pressures resulting from compression of the plastic liner during assembly, very strong forces maintaining the plastic liner in its assembled position in the joint socket. Accordingly, as a result of the construction of the present invention, an extremely inexpensive joint construction is provided without sacrificing any material advantages of prior construction of much more expensive manufacture.

It is, accordingly, an object of the present invention to provide an improved and greatly simplified pivot joint construction.

It is another object of the present invention to provide a pivot joint construction employing a plastic joint seat, wherein the seat is deformed during assembly of the joint to tightly retain a joint closure and sealing plate.

Still another object of the present invention is to provide a method of assembling a pivot joint wherein a closure plate is positively retained in assembled position without spinning or forging of the joint housing metal.

A feature of the invention resides in the construction of a joint seat of plastic for deforming co-operation with a joint closure plate.

Still another feature of the invention resides in the manufacture of a joint having a minimum of machining operations and a maximum of manufacturing tolerances, without sacrificing efficiency of the final product.

Still other and further objects and features of the present invention will at once become apparent to those skilled in the art from a consideration of the attached drawings wherein:

FIGURE 1 is an assembled view, in side-elevation, of a ball and socket form of the present invention;

FIGURE 2 comprises an exploded sub-assembly view, in side elevation, of the joint of the present invention illustrating the method of assembly thereof;

FIGURE 3 is an enlarged sub-assembly view, in elevation, of a ball stud plastic seat therefor in assembled relation;

FIGURE 4 is a modified form of the invention illustrated in FIGURE 1; and

FIGURE 5 is a further modified form of the pivot joint in accordance with the present invention.

As shown on the drawings:

As may be seen from a consideration of FIGURE 1, the joint of the present invention comprises a housing 10 positioned at the end of a first leg member 11. The housing 10 is provided with a generally cylindrical socket bore 12 in which a bearing seat 13 is positioned. The bearing seat has a generally segmental spherical interior surface 14 which co-operates with the spherical outside surface 15 of a ball stud 16. The stud 16 is secured by a tapered pin and aperture connection with a second link member 17 and is held in assembly by means of nut 18 and the wedging action between the tapered shank of the stud and the tapered aperture 17a of the member 17. Closure plate 20 is held against shoulder 21 of the joint liner 13 by an overhanging lip 22 formed by material of the liner itself. The closure plate 20 seals the end of the joint remote from the necked constriction 23 and a seal 25 is provided for sealing the opposite end of the joint socket.

The seat member 13, and its relationship with the closure plug or plate 20 and the ball stud 16 may clearly be seen from FIGURE 3. There the parts are shown in sub-assembly relation prior to assembly into the completed joint. As may be seen, the seat 13 is provided with a flaring enlargement 13a and a recessed shoulder 13b. The closure plate 20 has an outside diameter slightly smaller than the diameter of the shouldered recess 13c, permitting positioning of the plate 20 against the shoulder 13b without difficulty in the unassembled condition. The radius X of the stud ball surface 15 is greater than the radii X' and X'' of the surface 14 of the bearing seat and it will be observed that the center of curvature of the surface 14 is closer to the bearing seat than the centerline of the stud. As a result, when the bearing seat is snapped over the head of the stud, it closely surrounds the head of the stud at two annular lines G and H between which is a volume 14a where grease is held and retained during assembly. The secondary radius X'' is provided in the thickened body portion of the seat since upon assembly the flared part 13a flexes less than the thinner section at 14 and must be relieved to provide a snug fit and provide the sealing at edge G. The flared portion 13a should originate between the diameter line 0—0 and end 16a of the stud.

Assembly of the joint may be clearly understood from a study of FIGURE 2. As there shown, the socket bore 12 is substantially cylindrical. It is merely rough machined rather than finish machined. An assembly cone 26 is positioned over the open end of the socket and a ram 27 containing a spring biased plunger 28 which resiliently holds the closure plate 20 in position on the shoulder 21, is positioned against the end 24 of the plastic seat. Force is applied against the plunger 27 causing the ball stud and the seat to assume an assembled position shown in FIGURE 1. The external enlargement 13a of the seat is moved inwardly by the rigid confines of the bore 12 and in so moving deforms around the closure plate tightly wedging the closure plate in its assembled position and wedging the seat tightly against the bore 12. Due to the roughness of the bore 12 and its substantially cylindrical configuration, there is no danger of the plastic seat 13 moving out of the bore and as long as the plastic seat remains in its position within the bore, the closure plate 20 is positively retained in its assembled condition with the seat. Upon completion of the assembly process the cone 26 is, of course, removed.

As above pointed out, the nature of the bore 12 coupled with the compression of the plastic material of the seat 13 provides an extremely tight fit relationship which prevents movement of the seat out of the bore 12. In view of the elasticity of the plastic seat material, which is, preferably, high density polyethylene or the like, the seat may be positively retained, if desired. Such an arrangement is illustrated in FIGURE 4 wherein a slight retaining groove is illustrated at 30. During assembly the plastic seat snaps into the groove and is positively retained against removal backwardly past the shoulder by the resiliency of the seat material itself. It will be seen, further, that any axial force on the stud tending to move the seat out of the bore increases the wedging action against the bore. This is true since the ball 15 contacts the seat 13 through only a limited arc and acts as an expanding edge against area 14b. It will also be observed that the construction of the present joint is essentially fail-safe since the joined members 11 and 17 cannot under any circumstances be pulled apart since the necked-in constriction 23 is smaller than the maximum diameter of the ball surface 15.

FIGURE 5 illustrates a pivot joint of a barrel or cylindrical type. There, the seat 130 is provided with a shoulder 131 which will pass the cylinder 150 during subassembly but moves inwardly, upon movement of the seat into bore 12, to retain the stud. Closure plate 20 is, as in the embodiment of FIGURE 1, tightly held by the assembly pressures provided by deformation of the plastic seat.

From the above description it will be clear that I have provided an extremely simple ball joint construction, or the like, wherein the pivot seat is constructed of a somewhat yieldable resilient plastic and is press-fitted into a bore in a manner in which the seat is deformed to positively retain the closure plate in assembled relation and simultaneously to retain the seat and pivot stud in assembled relation in the bore. It will be apparent to those skilled in the art that variations may be undertaken without departing from the novel concepts of the present invention. For example, a spring biasing means may be positioned between the ball stud and the closure plate, if desired, without departing from the present invention. In view of such obvious variations, it is my intention that the scope of the present invention be limited solely by the scope of the hereinafter appended claims.

I claim as my invention:

1. A pivot joint comprising a housing member having a generally cylindrical bore therein,
   a necked-in shoulder in said bore providing an aperture,
   a stud projecting through said aperture into said bore and having an enlarged pivot bearing surface thereon,
   a load-carrying bearing seat positioned in said bore with an inwardly facing surface in bearing contact with said pivot bearing surface, said seat being generally annular with a constricted aperture at one end for passage of said stud and a passage at the other end,
   said seat comprising a yielding load-carrying plastic bearing material with an outwardly projecting surface tapering outwardly from a diameter approximately the same as the diameter of said bore to a diameter substantially greater than the diameter of said bore when said seat is in the unstressed unassembled state, a counterbore in said passage at said other end providing a recessed shoulder for seating a closure plate, a closure plate seated on said recessed shoulder, said closure plate having a free fit with the sidewalls of said counterbore prior to assembly of the seat in said bore,
   said seat deforming to envelop the edges of the plate when the seat is forced into said bore and said outwardly projecting surface is compressed inwardly to conform to the bore in assembly whereby said plate is positively retained in position on said shoulder by the material of said seat forming said counterbore.

2. A joint constructed in accordance with claim 1 wherein said bore has a recess in the sidewall thereof receiving said outwardly projecting surface of said seat upon assembly thereof into said bore and locking said seat in said bore by the resiliency of the seat material in the deformed state when assembled in said bore.

3. A joint constructed in accordance with claim 1 wherein said shoulder in said seat is located axially between the points of minimum diameter and maximum diameter of said outwardly projecting surface of said seat.

4. A pivot joint comprising a housing member having a generally cylindrical bore therein,
   a necked-in shoulder in said bore providing an aperture,
   a stud projecting through said aperture into said bore and having a segmental spherical bearing surface thereon,
   a load-carrying bearing seat positioned in said bore with an inwardly facing segmental spherical surface in bearing contact with said segmental spherical bearing surface of said stud, said seat being generally annular with a constricted aperture at one end for passage of said stud and a passage at the other end,
   said seat comprising a yielding load-carrying plastic bearing material with an outwardly projecting surface tapering outwardly from a diameter approximately the same as the diameter of said bore to a diameter substantially greater than the diameter of said bore when said seat is in the unstressed unassembled state, a counterbore in said passage at said other end providing a recessed shoulder for seating a closure plate, a closure plate seated on said recessed shoulder, said closure plate having a free fit with the sidewall of said counterbore prior to assembly of the seat in said bore,
   said seat deforming to envelop the edges of the plate when the seat is forced into said bore and said outwardly projecting surface is compressed inwardly to conform to the bore in assembly whereby said plate is positively retained in position on said shoulder by the material of said seat.

References Cited by the Examiner

UNITED STATES PATENTS

| | | |
|---|---|---|
| 2,942,901 | 6/1960 | Booth. |
| 2,956,476 | 10/1960 | Rupert. |
| 3,007,728 | 11/1961 | Hoffman. |
| 3,008,743 | 11/1961 | Westercamp. |
| 3,063,744 | 11/1962 | Flumerfelt _____ 287—87 |
| 3,068,031 | 12/1962 | Herbenar. |

FOREIGN PATENTS

| | | |
|---|---|---|
| 582,421 | 8/1933 | Germany. |
| 720,912 | 5/1942 | Germany. |
| 600,264 | 4/1948 | Great Britain. |
| 816,567 | 7/1959 | Great Britain. |

CARL W. TOMLIN, *Primary Examiner.*